United States Patent
Zhong et al.

(10) Patent No.: US 12,237,874 B2
(45) Date of Patent: Feb. 25, 2025

(54) LINE ORDER DETECTION METHOD AND MULTI-ANTENNA NETWORK DEVICE

(71) Applicant: HUAWEI TECHNOLOGIES CO., LTD., Guangdong (CN)

(72) Inventors: Hui Zhong, Shanghai (CN); Pengcheng Zhang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 368 days.

(21) Appl. No.: 17/893,674

(22) Filed: Aug. 23, 2022

(65) Prior Publication Data
US 2023/0028869 A1    Jan. 26, 2023

Related U.S. Application Data

(63) Continuation of application No. PCT/CN2021/073521, filed on Jan. 25, 2021.

(30) Foreign Application Priority Data

Feb. 26, 2020    (CN) .......................... 202010121240.2

(51) Int. Cl.
*H04B 17/318*    (2015.01)
*H01Q 3/06*    (2006.01)
*H04W 16/28*    (2009.01)

(52) U.S. Cl.
CPC ............. *H04B 17/318* (2015.01); *H01Q 3/06* (2013.01); *H04W 16/28* (2013.01)

(58) Field of Classification Search
None
See application file for complete search history.

(56) References Cited

U.S. PATENT DOCUMENTS

| 8,670,722 B2 * | 3/2014 | Miao ...................... H01Q 3/267 455/67.11 |
| 2010/0120415 A1 | 5/2010 | Urquhart et al. |

(Continued)

FOREIGN PATENT DOCUMENTS

| CN | 101154977 A | 4/2008 |
| CN | 102549950 A | 7/2012 |

(Continued)

OTHER PUBLICATIONS

Office Action issued in Chinese Application No. 202010121240.2 on Dec. 16, 2021, 12 pages (with English translation).

(Continued)

*Primary Examiner* — Phirin Sam
(74) *Attorney, Agent, or Firm* — Fish & Richardson P.C.

(57) ABSTRACT

The present disclosure provides example line order detection methods and multi-antenna network devices. One example method includes obtaining preset antenna numbers of a target antenna group. A first uplink received signal strength sequence of each antenna channel is determined based on a first uplink reference signal sequence from a terminal. After an antenna downtilt angle of the target antenna group is adjusted from a first downtilt angle to a second downtilt angle, a second uplink received signal strength sequence of each antenna channel is determined based on a second uplink reference signal sequence from the terminal. Actual antenna numbers of the target antenna group are determined based on the first uplink received signal strength sequence and the second uplink received signal strength sequence of each antenna channel. When the preset antenna numbers are different than the actual antenna numbers, a line order is determined to be incorrect.

11 Claims, 8 Drawing Sheets

(56) References Cited

U.S. PATENT DOCUMENTS

| | | | |
|---|---|---|---|
| 2014/0141728 A1 | 5/2014 | Devarasetty et al. | |
| 2015/0327087 A1 | 11/2015 | Xu et al. | |
| 2016/0080051 A1* | 3/2016 | Sajadieh | H04W 48/16 375/267 |
| 2016/0135062 A1* | 5/2016 | Lee | H04W 24/02 370/252 |

FOREIGN PATENT DOCUMENTS

| | | |
|---|---|---|
| CN | 102905279 A | 1/2013 |
| CN | 104639263 A | 5/2015 |
| CN | 105721072 A | 6/2016 |
| CN | 106330345 A | 1/2017 |
| CN | 106856417 A | 6/2017 |
| CN | 108988913 A | 12/2018 |
| CN | 109788504 A | 5/2019 |
| CN | 110086513 A | 8/2019 |
| CN | 110536310 A | 12/2019 |
| CN | 110708098 A | 1/2020 |
| EP | 3624359 A1 | 3/2020 |
| EP | 3796568 A1 | 3/2021 |
| WO | 2018219328 A1 | 12/2018 |
| WO | 2019127470 A1 | 7/2019 |

OTHER PUBLICATIONS

PCT International Search Report and Written Opinion issued in International Application No. PCT/CN2021/073521 on Apr. 23, 2021, 22 pages (with English translation).

Partial Supplementary European Search Report in European AppIn No. 21759842.4, dated Jun. 15, 2023, 15 pages.

* cited by examiner

LINE ORDER DETECTION METHOD AND MULTI-ANTENNA NETWORK DEVICE

CROSS-REFERENCE TO RELATED APPLICATIONS

This application is a continuation of International Application No. PCT/CN2021/073521, filed on Jan. 25, 2021, which claims priority to Chinese Patent Application No. 202010121240.2, filed on Feb. 26, 2020. The disclosures of the aforementioned applications are hereby incorporated by reference in their entireties.

TECHNICAL FIELD

This application relates to the field of communication technologies, and in particular, to a line order detection method and a multi-antenna network device.

BACKGROUND

In a wireless mobile communication system, a multi-antenna technology is also widely used. As a quantity of antennas of a network device increases, a connection between an antenna port and a port of a remote radio unit (RRU) is also increasingly more complex.

To eliminate a connection error between ports, currently, determining is performed by manually detecting whether a line number is consistent with an antenna port. If the line number is consistent with the antenna port, it indicates that the connection is correct. If the line number is inconsistent with the antenna port, it indicates that the connection is incorrect.

In actual application, detection miss may exist in manual check. Consequently, secondary installation is required, and costs of climbing up a tower are increased.

SUMMARY

In view of this, this application provides a line order detection method and a multi-antenna network device, so that whether a connection between an antenna port and a port of an RRU is correct can be quickly detected, and secondary construction is reduced.

According to a first aspect, a line order detection method applied to a multi-antenna network device is provided. In the method, preset antenna numbers of a target antenna group are obtained; when the target antenna group is configured with a first downtilt angle and a remaining antenna group is configured with a preset downtilt angle, a first uplink reference signal sequence sent by a terminal is received; a first uplink received signal strength sequence of each antenna channel is determined based on the first uplink reference signal sequence; an antenna downtilt angle of the target antenna group is adjusted from the first downtilt angle to a second downtilt angle; when the target antenna group is configured with the second downtilt angle and the remaining antenna group is configured with the preset downtilt angle, a second uplink reference signal sequence sent by the terminal is received; a second uplink received signal strength sequence of each antenna channel is determined based on the second uplink reference signal sequence; a signal strength change amplitude of each antenna channel is determined based on the first uplink received signal strength sequence and the second uplink received signal strength sequence of each antenna channel; actual antenna numbers of the target antenna group are determined based on N maximum values in all signal strength change amplitudes; and when there are different antenna numbers in the preset antenna numbers and the actual antenna numbers, it is determined that an order of lines connecting antenna ports of the target antenna group and ports of a remote radio unit is incorrect. The first uplink received signal strength sequence and the second uplink received signal strength sequence include a same quantity of uplink received signal strength values. N is a total quantity of antennas in each antenna group.

In this implementation, after the downtilt angle of the target antenna group is adjusted, a signal strength change amplitude of a received signal in an antenna channel corresponding to the target antenna group is relatively large, and a signal strength change amplitude of a received signal in an antenna channel corresponding to another antenna group whose downtilt angle is not adjusted is relatively small. Therefore, the actual antenna numbers of the target antenna group may be determined based on the signal strength change amplitude of the antenna channel. It can be determined, by comparing the actual antenna numbers with the preset antenna numbers, whether a connection between the antenna port of the target antenna group and the port of the RRU is correct. If the foregoing two antenna numbers are different, it indicates that there is inter-column out-of-order between the target antenna group and the RRU. Compared with manual detection of a line order, the foregoing detection method can improve accuracy and improve line order detection efficiency.

In an implementation, the signal strength change amplitude is a mean square error of the first uplink received signal strength sequence and the second uplink received signal strength sequence, or the signal strength change amplitude is a variance of the first uplink received signal strength sequence and the second uplink received signal strength sequence. Two specific methods for calculating the signal strength change amplitude are described herein for ease of solution implementation.

In another implementation, when the preset antenna numbers are the same as the actual antenna numbers, an antenna downtilt angle of each antenna group is adjusted to a same downtilt angle; an uplink channel coefficient of each antenna channel is determined based on an uplink reference signal sent by the terminal; a correlation coefficient matrix is determined based on the uplink channel coefficient of each antenna channel; a correlation coefficient of a first antenna and a second antenna and a correlation coefficient of the first antenna and a third antenna are selected from the correlation coefficient matrix; and when the correlation coefficient of the first antenna and the second antenna is less than or equal to the correlation coefficient of the first antenna and the third antenna, it is determined that there is inter-polarization out-of-order. When one antenna group includes two antennas, the first antenna is either antenna in the remaining antenna group, the second antenna is an antenna that is in the target antenna group and that has a same polarization direction as the first antenna, and the second antenna and the third antenna are a same dual-polarized antenna. When one antenna group includes four or more antennas, the first antenna is any antenna in the remaining antenna group or the target antenna group, the second antenna is an antenna that is in the target antenna group and that has a same polarization direction as the first antenna, and the second antenna and the third antenna are a same dual-polarized antenna.

When the preset antenna numbers are the same as the actual antenna numbers, it indicates that antennas included in the target antenna group are correct, but whether an order of the antennas in the target antenna group is correct needs to be further determined. When a correlation coefficient of co-polarized antennas is less than or equal to a correlation coefficient of hetero-polarized antennas, it indicates that there is polarization out-of-order. When the correlation coefficient of co-polarized antennas is greater than the correlation coefficient of hetero-polarized antennas, it indicates that a line order is correct. In the foregoing method, each dual-polarized antenna in the target antenna group can be determined, so that detection accuracy is further improved.

In another implementation, alarm information is output when there are different antenna numbers in the preset antenna numbers and the actual antenna numbers, and the alarm information includes the actual antenna numbers of the target antenna group. When there are different antenna numbers in the preset antenna numbers and the actual antenna numbers, it indicates that the connection between the antenna port and the port of the RRU is incorrect. If the alarm information is output, installation personnel can be notified to check a connection line of the antenna port of the target antenna group. In this way, a wrong line can be prompted, so that the installation personnel can quickly adjust the line order.

According to a second aspect, a line order detection method applied to a multi-antenna network device is provided. In the method, an uplink reference signal sent by a terminal is received; an uplink channel coefficient of each antenna channel is determined based on the uplink reference signal; a correlation coefficient matrix is determined based on the uplink channel coefficient of each antenna channel; a correlation coefficient of a first antenna and a second antenna and a correlation coefficient of the first antenna and a third antenna are selected from the correlation coefficient matrix, where the first antenna and the second antenna have a same polarization direction, and the second antenna and the third antenna are a same dual-polarized antenna; and when the correlation coefficient of the first antenna and the second antenna is less than or equal to the correlation coefficient of the first antenna and the third antenna, it is determined that there is inter-polarization out-of-order. The multi-antenna network device has a plurality of dual-polarized antennas, and the dual-polarized antenna includes two antennas with different polarization directions. The dual-polarized antenna may be but is not limited to a ±45-degree polarized antenna.

According to a third aspect, a line order detection method applied to a multi-antenna network device is provided. In the method, a preset steering vector sequence is obtained; an uplink reference signal sent by a terminal is received; channel estimation is performed based on the uplink reference signal; a matrix set is determined based on all arrangement combinations of uplink channel coefficients in an uplink channel coefficient matrix obtained through channel estimation, an angular power spectrum set is determined based on the matrix set and the steering vector sequence; a target matrix corresponding to a maximum value in the angular power spectrum set is determined; and when an antenna order corresponding to the target matrix is the same as a preset line order, it is determined that a connection between an antenna port of an antenna unit and a port of a remote radio unit is correct; or when an antenna order corresponding to the target matrix is different from a preset line order, it is determined that a connection between an antenna port of an antenna unit and a port of a remote radio unit is incorrect. The steering vector sequence includes a steering vector corresponding to each signal incidence angle, and the angular power spectrum set includes an angular power spectrum of each angle. After all uplink channel coefficient matrices and all steering vector sequences are obtained, all results of the uplink channel coefficient matrices and the steering vector sequences are calculated, and then an actual line order is determined based on a correspondence between the maximum value in the angular power spectrum set and a correct line order. In this way, a method for detecting a line order based on an angular power spectrum is provided, so that detection flexibility is improved.

In another implementation, a matrix in the matrix set, a steering vector in the steering vector sequence, and an angular power spectrum in the angular power spectrum set meet the following formula.

$$P_{ij}=(V_i \times H_j) \times (V_i \times H_j)^T, \text{ where}$$

$V_i$ is an $i^{th}$ steering vector, $H_j$ is a $j^{th}$ matrix, and $P_{ij}$ is an angular power spectrum corresponding to $V_i$ and $H_j$.

In another implementation, the line order detection method further includes: adjusting a preset channel forming matrix based on the antenna order corresponding to the target matrix when the antenna order corresponding to the target matrix is different from the preset line order; and performing channel forming on a to-be-processed radio signal based on the adjusted channel forming matrix.

According to a fourth aspect of this application, a multi-antenna network device is provided, and has a function of implementing the line order detection method in the first aspect. The function may be implemented by hardware or software. The hardware or software includes one or more function modules.

According to a fifth aspect of this application, a multi-antenna network device is provided, and has a function of implementing the line order detection method in the second aspect. The function may be implemented by hardware or software. The hardware or software includes one or more function modules.

According to a sixth aspect of this application, a multi-antenna network device is provided, and has a function of implementing the line order detection method in the third aspect. The function may be implemented by hardware or software. The hardware or software includes one or more function modules.

According to a seventh aspect of this application, a computer-readable storage medium is provided. The computer-readable storage medium stores instructions; and when the instructions are executed, the line order detection methods in the foregoing aspects are performed.

According to an eighth aspect of this application, a computer program product including instructions is provided; and when the instructions are executed, the line order detection methods in the foregoing aspects are performed.

DESCRIPTION OF EMBODIMENTS

A line order detection method in this application may be applied to a multi-antenna network device. The multi-antenna network device may be a base station, and the base station may be a long term evolution (LTE) base station, a 5G base station, or an evolved NodeB after 5G. The multi-antenna network device may implement multi-input and multi-output of a signal by using an antenna array.

Figure 1A:
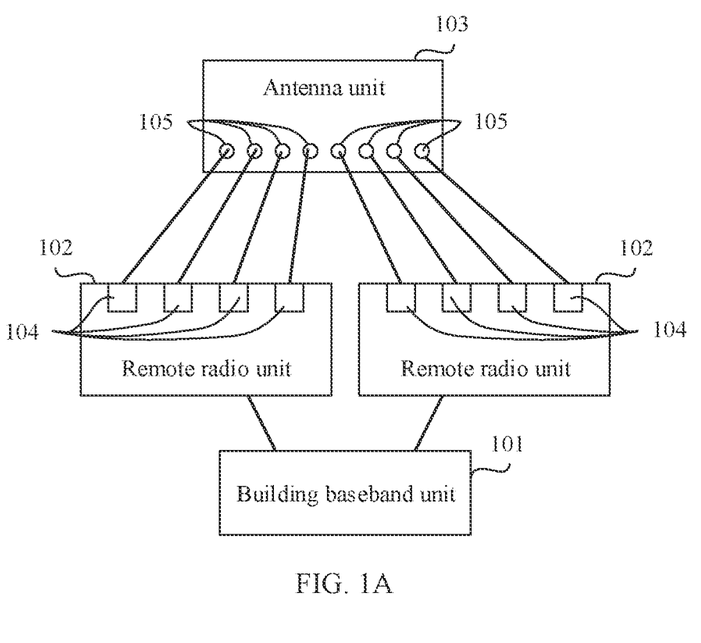
FIG. 1A is a schematic diagram of a connection between an antenna and a remote radio unit according to an embodiment of this application.
Figure 1B:
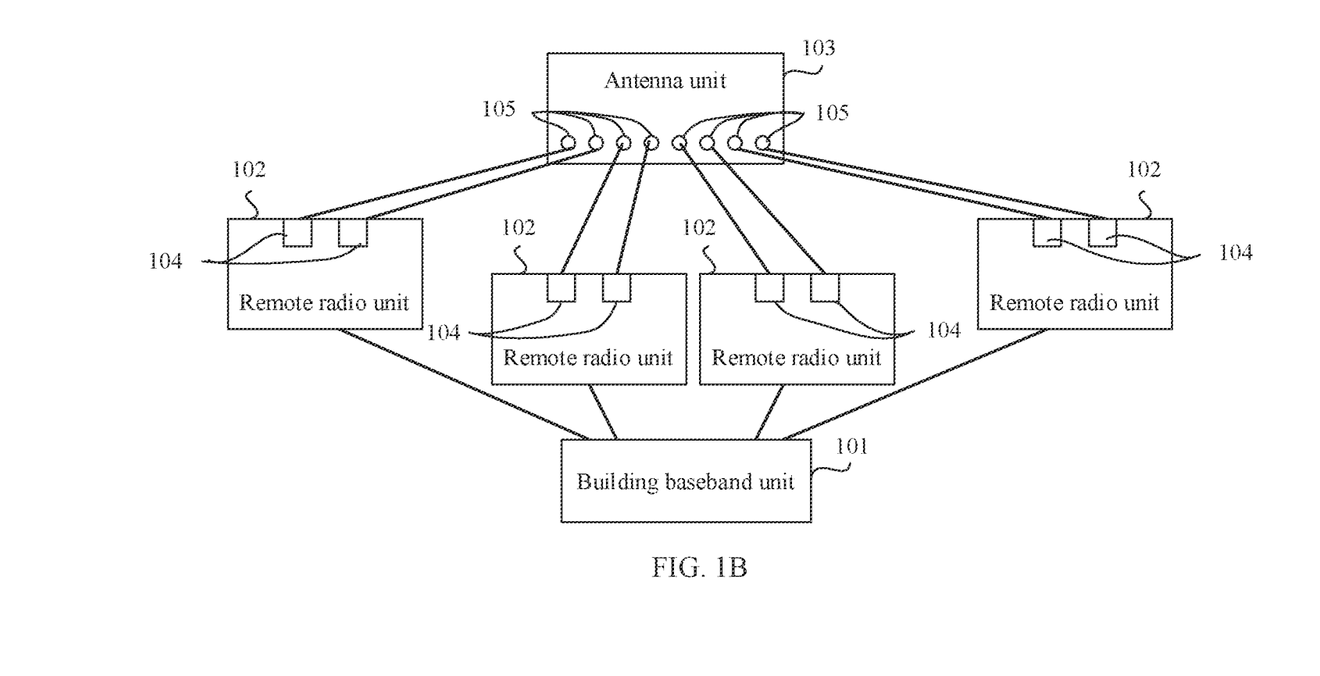
FIG. 1B is another schematic diagram of a connection between an antenna and a remote radio unit according to an embodiment of this application.

As shown in FIG. 1A and FIG. 1B, a multi-antenna network device may include a building baseband unit (BBU) 101, an RRU 102, and an antenna unit 103.

The BBU 101 can implement a baseband processing function of a Uu interface, such as coding, multiplexing, modulation, or spectrum spreading.

The RRU 102 can implement a function of an Iub interface, a signaling processing function, a local and remote operation maintenance function, and functions of monitoring a working status of the network device and reporting alarm information.

The antenna unit 103 may include an antenna and a remote electrical tilt (RET) unit that are connected. The remote electrical tilt unit can adjust a downtilt angle of the antenna. Each remote electrical tilt unit may be connected to one antenna group, and each antenna group includes one or more antennas. The antenna is also referred to as an antenna element. Each antenna corresponds to one antenna channel, and the antenna channel is a channel logically used to transmit a radio signal.

The RRU 102 may have four or two ports 104 used to connect to the antenna unit. The antenna unit 103 may have eight or four antenna ports 105 used to connect to the RRU. It may be understood that a quantity of ports 104 of the RRU and a quantity of antenna ports 105 may alternatively be other values, and are not limited to the foregoing examples. The port 104 of the RRU is in a one-to-one correspondence with the antenna port 105.

When the antenna unit 103 includes four antennas, that is, when the antenna unit 103 includes a 4T4R antenna, the antenna unit 103 may be connected to two dual-port RRUs.

When the antenna unit 103 includes eight antennas, that is, when the antenna unit 103 includes an 8T8R antenna, the antenna unit 103 may be connected to two four-port RRUs 102, as shown in FIG. 1A; or the antenna unit 103 may be connected to four dual-port RRUs 102, as shown in FIG. 1B.

It may be understood that the multi-antenna network device may further include a memory and/or an input/output apparatus. The memory is mainly configured to store instructions, data, and a signal. The input/output apparatus is configured to receive data input by a user and output data to the user. In an actual multi-antenna network device, there may be one or more BBUs 101, one or more RRUs 102, one or more antenna units 103, one or more memories, and one or more input transmission apparatuses.

When data needs to be sent, after performing baseband processing on the to-be-sent data, the BBU 101 outputs a baseband signal to the RRU 102. After performing radio frequency processing on the baseband signal, the RRU 102 sends a radio frequency signal in a form of an electromagnetic wave by using the antenna unit 103. When data is sent to the multi-antenna network device, the RRU 102 receives a radio frequency signal by using the antenna unit 103, converts the radio frequency signal into a baseband signal, and outputs the baseband signal to the BBU 101, and the BBU 101 converts the baseband signal into data and processes the data.

In this application, the antenna unit 103 and the RRU 102 that have a transmitting/receiving function may be considered as a transceiver unit of the multi-antenna network device, and the BBU 101 having a processing function may be considered as a processing unit of the multi-antenna network device. It should be understood that the transceiver unit is configured to perform a receiving operation and an operation of adjusting an antenna downtilt angle in this application. The processing unit is configured to perform an operation other than a transmitting/receiving operation and the operation of adjusting an antenna downtilt angle in this application.

Figure 3:
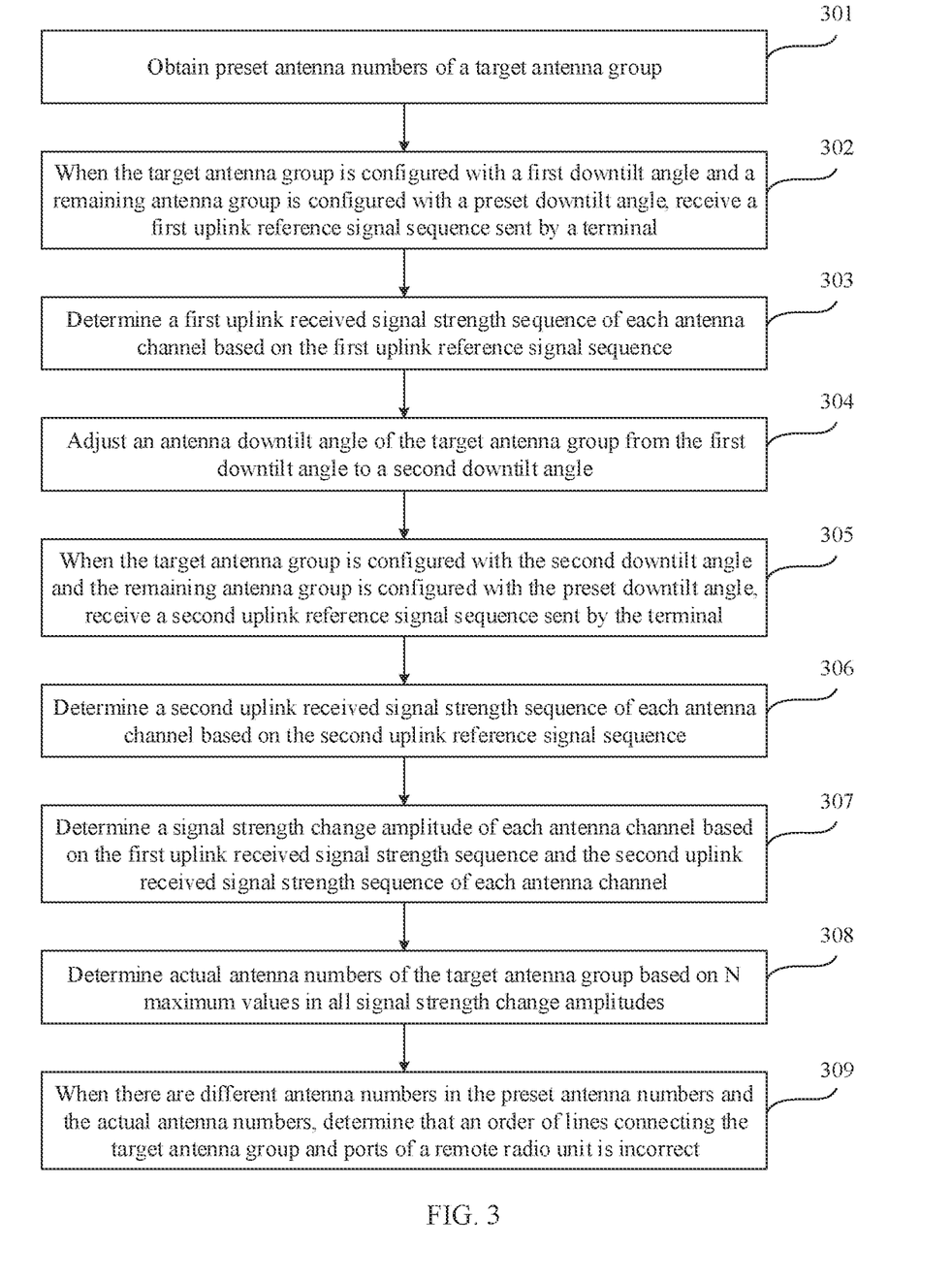
FIG. 3 is a schematic flowchart of a line order detection method according to an embodiment of this application.

For example, in an implementation, the transceiver unit is configured to perform step 302, step 304, and step 305 in FIG. 3, and the processing unit is configured to perform step 301, step 303, and step 306 to step 309 in FIG. 3.

Figure 4:
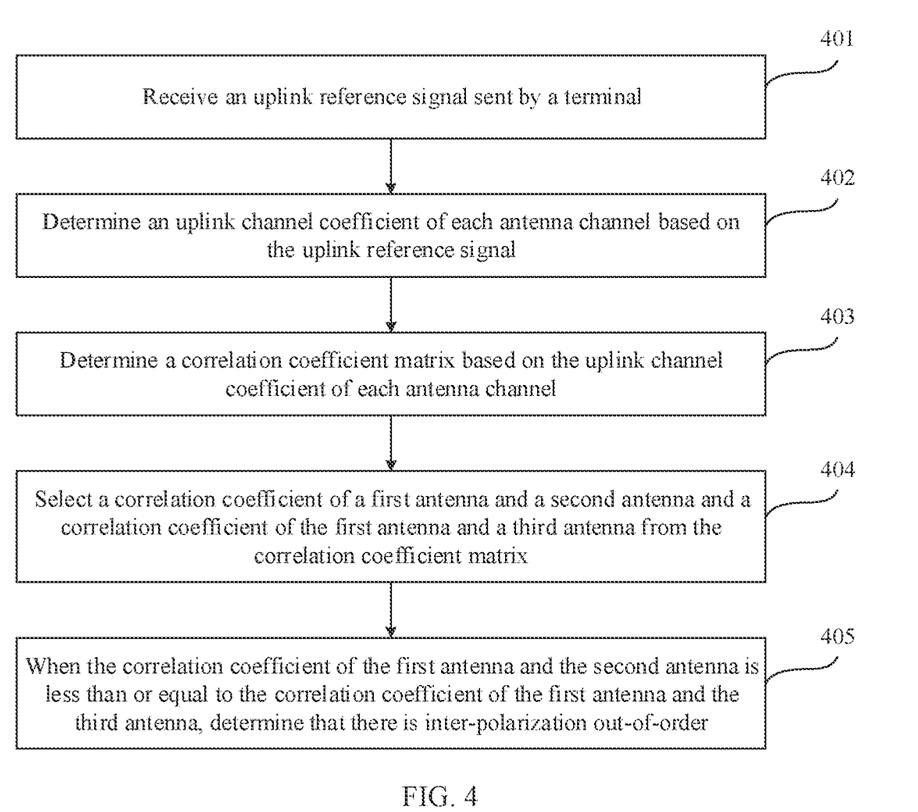
FIG. 4 is another schematic flowchart of a line order detection method according to an embodiment of this application.

In another implementation, the transceiver unit is configured to perform step 401 in FIG. 4, and the processing unit is configured to perform step 402 to step 405 in FIG. 4.

Figure 6:
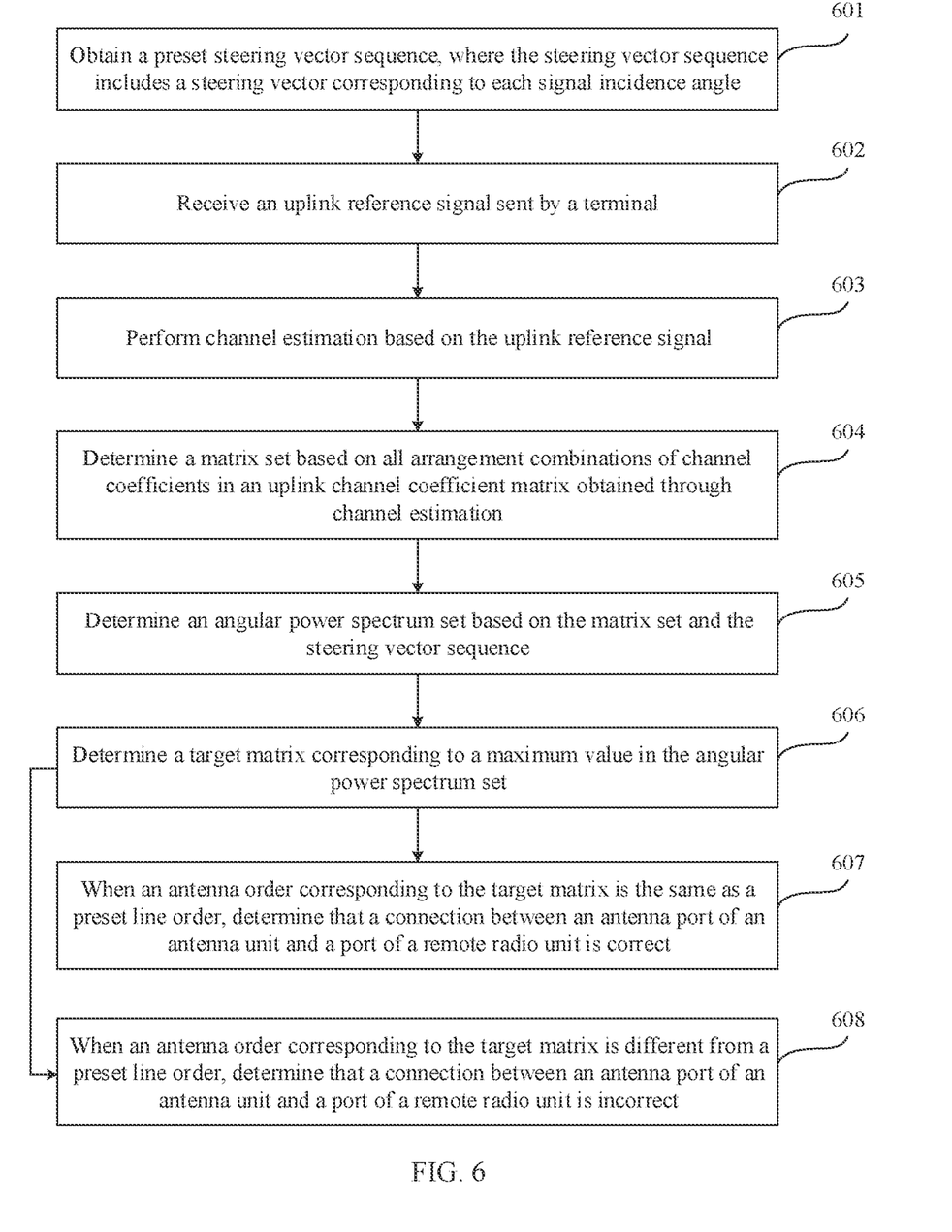
FIG. 6 is another schematic flowchart of a line order detection method according to an embodiment of this application.

In another implementation, the transceiver unit is configured to perform step 602 in FIG. 6, and the processing unit is configured to perform step 601, and step 603 to step 608 in FIG. 6.

Figure 2A:
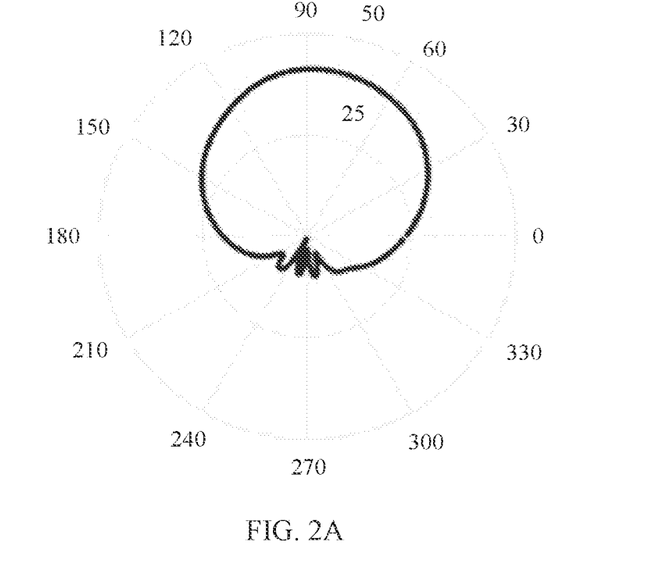
FIG. 2A is an antenna radiation pattern when an antenna and a remote radio unit are normally connected according to an embodiment of this application.
Figure 2B:
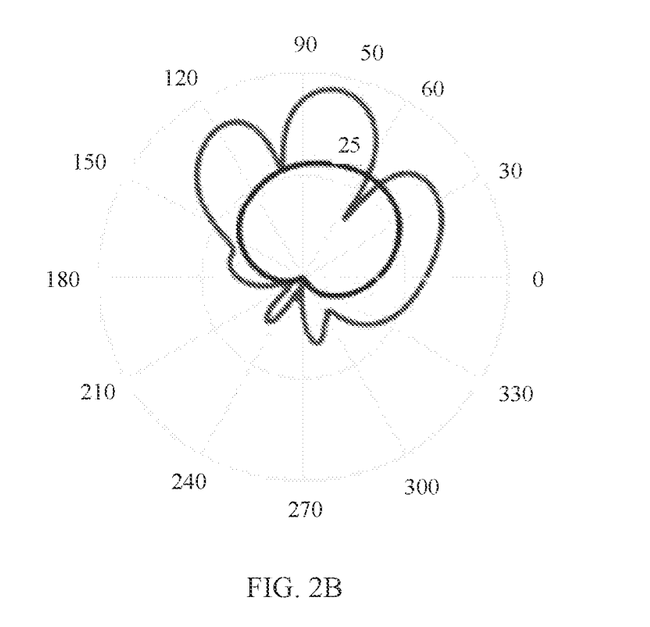
FIG. 2B is an antenna radiation pattern when an antenna and a remote radio unit are abnormally connected according to an embodiment of this application.

As shown in FIG. 2A and FIG. 2B, an 8T8R antenna unit 103 and a four-port RRU 102 are used as examples. When the antenna port 105 and the port 104 of the RRU are normally connected, an antenna radiation pattern in a horizontal direction is shown in FIG. 2A. When a port of an antenna unit and the port of the RRU are abnormally connected, an antenna radiation pattern in a horizontal direction is shown in FIG. 2B. In this case, a network coverage area cannot cover a specified area, and wireless performance of the network device is also affected. RANK 2 is used as an example. RANK 2 is a quantity of data streams that can be simultaneously transmitted in a downlink. When a connection is abnormal, RANK 2 is only 0.68 of RANK 2 when the connection is normal. This indicates that, when the connection is abnormal, the quantity of data streams that can be simultaneously transmitted in the downlink is much less than that in a normal case. In this case, a downlink throughput significantly decreases, and communication performance of the network device is affected.

To identify abnormality of a connection between an antenna port and a port of an RRU in a multi-antenna network device in a timely manner, this application provides a plurality of line order detection methods. In a first line order detection method, whether a connection error exists on a line can be determined based on a signal strength change amplitude of an antenna channel. For details, refer to the following embodiment. As shown in FIG. 3, an embodiment of a line order detection method in this application includes the following steps.

Step 301: Obtain preset antenna numbers of a target antenna group.

In this embodiment, one or more remote electrical tilt units are configured for an antenna unit of a multi-antenna network device. Any remote electrical tilt unit may be selected as a target remote electrical tilt unit, and an antenna group connected to the target remote electrical tilt unit is used as the target antenna group, and then the preset antenna numbers of the target antenna group are obtained.

Step 302: When the target antenna group is configured with a first downtilt angle and a remaining antenna group is configured with a preset downtilt angle, receive a first uplink reference signal sequence sent by a terminal.

An uplink reference signal may be but is not limited to a sounding reference signal (SRS) or a demodulation reference signal (DMRS) of a channel.

The remaining antenna group is an antenna group other than the target antenna group in the antenna unit. In the remaining antenna group, one preset downtilt angle is configured for each antenna group, and different downtilt angles may be configured for different antenna groups.

Step 303: Determine a first uplink received signal strength sequence of each antenna channel based on the first uplink reference signal sequence.

Each uplink received signal strength sequence includes a plurality of uplink received signal strength values, that is, (received signal strength indicator, RSSI) values of uplink signals.

Step 304: Adjust an antenna downtilt angle of the target antenna group from the first downtilt angle to a second downtilt angle.

The target remote electrical tilt unit may adjust the antenna downtilt angle of the target antenna group, and the first downtilt angle is not equal to the second downtilt angle.

Step 305: When the target antenna group is configured with the second downtilt angle and the remaining antenna group is configured with the preset downtilt angle, receive a second uplink reference signal sequence sent by the terminal.

Step 306: Determine a second uplink received signal strength sequence of each antenna channel based on the second uplink reference signal sequence.

Step 307: Determine a signal strength change amplitude of each antenna channel based on the first uplink received signal strength sequence and the second uplink received signal strength sequence of each antenna channel.

The first uplink received signal strength sequence and the second uplink received signal strength sequence include a same quantity of values. Optionally, the signal strength change amplitude is a mean square error of the first uplink received signal strength sequence and the second uplink received signal strength sequence, or the signal strength change amplitude is a variance of the first uplink received signal strength sequence and the second uplink received signal strength sequence.

The mean square error is used as an example. It is assumed that a first uplink received signal strength sequence of an antenna channel 1 is $a_{11}, a_{12}, a_{13}, \ldots, a_{1n}$, and a second uplink received signal strength sequence is $b_{11}, b_{12}, b_{13}, \ldots, b_{1n}$. A mean square error of the two sequences =

$$\frac{1}{n}\sqrt{(b_{11} - a_{11})^2 + (b_{12} - a_{12})^2 + (b_{13} - a_{13})^2 + \ldots + (b_{1n} - a_{1n})^2},$$

where n is a positive integer.

It may be understood that, in actual application, the signal strength change amplitude may alternatively be calculated in another manner. For example, an absolute value of a difference between corresponding uplink received signal strength in the two sequences is separately calculated, and then a sum of all absolute values is calculated, and the sum is used as the signal strength change amplitude.

Step 308: Determine actual antenna numbers of the target antenna group based on N maximum values in all signal strength change amplitudes.

After the signal strength change amplitude of each antenna channel is calculated, antenna channels corresponding to the N maximum values are determined. N is a total quantity of antennas in each antenna group, and N is a positive integer. When the target antenna group includes two antennas, a maximum value and a second maximum value are selected from all the signal strength change amplitudes, and antenna numbers corresponding to the maximum value and the second maximum value are the actual antenna numbers of the target antenna group.

Step 309: When there are different antenna numbers in the preset antenna numbers and the actual antenna numbers, determine that an order of lines connecting the target antenna group and ports of a remote radio unit is incorrect.

For example, if the preset antenna numbers of the target antenna group are separately 1 and 2, and the actual antenna numbers are separately 1 and 6, it may be determined, based on a comparison result, that a connection between the port of the RRU and an antenna port 1 or an antenna port 6 is incorrect. If the preset antenna numbers of the target antenna group are separately 1 and 2, and the actual antenna numbers are separately 2 and 1, it is considered that the preset antenna numbers are the same as the actual antenna numbers.

The applicant finds that when an antenna of the network device is at different antenna downtilt angles, a coverage area of the network device is different, and signal strength of the uplink signal is different. In this embodiment, after the downtilt angle of the target antenna group is adjusted, a signal strength change amplitude of a received signal in an antenna channel corresponding to the target antenna group is relatively large, and a signal strength change amplitude of a received signal in an antenna channel corresponding to another antenna group whose downtilt angle is not adjusted is relatively small. Because the signal strength change amplitude in the antenna channel corresponding to the target antenna group is greater than the signal strength change amplitude in the antenna channel corresponding to the another antenna group, the actual antenna numbers of the target antenna group may be determined based on the signal strength change amplitude of the antenna channel, and then whether the connection between the antenna port of the target antenna group and the port of the RRU is correct may be determined by comparing the actual antenna numbers and the preset antenna numbers. If the foregoing two antenna numbers are different, it indicates that there is inter-column out-of-order between the target antenna group and the RRU. Based on the foregoing method, an actual antenna numbers of each antenna group may be obtained, to check all line orders.

It should be noted that a process of obtaining the preset antenna numbers described in step 301 and a process of obtaining the actual antenna numbers described in step 302 to step 308 are two independent processes, and the two processes have no fixed sequence. The preset antenna numbers may be obtained between step 302 and step 308, or may be obtained after step 308. This is not limited in this application.

In an optional embodiment, the line order detection method further includes:

when the preset antenna numbers are the same as the actual antenna numbers, adjusting an antenna downtilt angle of each antenna group to a same downtilt angle; determining an uplink channel coefficient of each antenna channel based on an uplink reference signal sent by the terminal; determining a correlation coefficient matrix based on the uplink channel coefficient of each antenna channel; selecting a correlation coefficient of a first antenna and a second antenna and a correlation coefficient of the first antenna and a third antenna from the correlation coefficient matrix; and when the correlation coefficient of the first antenna and the second antenna is less than or equal to the correlation coefficient of the first antenna and the third antenna, determining that there is inter-polarization out-of-order.

In this embodiment, when one antenna group includes two antennas, the first antenna is either antenna in the remaining antenna group, the second antenna is an antenna that is in the target antenna group and that has a same polarization direction as the first antenna, and the second antenna and the third antenna are a same dual-polarized antenna. When one antenna group includes four or more antennas, the first antenna is any antenna in the remaining antenna group or the target antenna group, the second antenna is an antenna that is in the target antenna group and that has a same polarization direction as the first antenna, and the second antenna and the third antenna are a same dual-polarized antenna. For a method for calculating the correlation coefficient matrix based on uplink channel coefficients of all antenna channels, refer to corresponding descriptions in an embodiment shown in FIG. 4.

When the preset antenna numbers are the same as the actual antenna numbers, it indicates that antennas included in the target antenna group are correct, but whether an order of the antennas in the target antenna group is correct needs to be further determined. When a correlation coefficient of co-polarized antennas is less than or equal to a correlation coefficient of hetero-polarized antennas, it indicates that there is polarization out-of-order. When the correlation coefficient of co-polarized antennas is greater than the correlation coefficient of hetero-polarized antennas, it indicates that a line order is correct. In the foregoing method, each dual-polarized antenna in the target antenna group can be determined, so that detection accuracy is further improved.

In this application, an alarm signal may be further sent when the line order is incorrect. In an optional embodiment, the line order detection method further includes: outputting alarm information when there are different antenna numbers in the preset antenna numbers and the actual antenna numbers, where the alarm information includes the actual antenna numbers of the target antenna group.

When there are different antenna numbers in the preset antenna numbers and the actual antenna numbers, it indicates that the connection between the antenna port and the port of the RRU is incorrect. If the alarm information is output, installation personnel can be notified to check a connection line of the antenna port of the target antenna group. In this way, a wrong line can be prompted, so that the installation personnel can quickly adjust the line order. The alarm information may be text, a symbol, an image, or sound, or may be a combination of the foregoing one or more types of information. In addition to the actual antenna numbers of the target antenna group, the alarm information may further include the preset antenna numbers of the target antenna group.

In a second line order detection method, line order detection can be performed on a multi-antenna network device with a polarized antenna. For details, refer to the following embodiment. As shown in FIG. 4, another embodiment of a line order detection method provided in this application includes the following steps.

Step 401: Receive an uplink reference signal sent by a terminal.

In this embodiment, an antenna downtilt angle of each antenna is configured as a same downtilt angle. The uplink reference signal is an SRS or a DMRS.

Step 402: Determine an uplink channel coefficient of each antenna channel based on the uplink reference signal.

The uplink channel coefficient of each antenna channel may be obtained by separately performing channel estimation on an uplink reference signal received by each antenna channel.

Step 403: Determine a correlation coefficient matrix based on the uplink channel coefficient of each antenna channel.

Uplink channel coefficients of all antenna channels may form an uplink channel coefficient matrix. A total quantity of antennas is N. For example, uplink channel coefficients of eight channels may form an 8×1 matrix. Because the channel coefficient matrix is an N×1 matrix, the channel coefficient matrix is also referred to as an uplink channel coefficient vector.

The uplink channel coefficient matrix is denoted as H, and a transposed matrix of H is denoted as $H^T$. An N×N matrix obtained by multiplying H and $H^T$ is the correlation coefficient matrix. An element $h_{ij}$ in the matrix represents correlation between an antenna channel i and an antenna channel j, and is also correlation between an $i^{th}$ antenna and a $j^{th}$ antenna.

Step 404: Select a correlation coefficient of a first antenna and a second antenna and a correlation coefficient of the first antenna and a third antenna from the correlation coefficient matrix.

Figure 5:
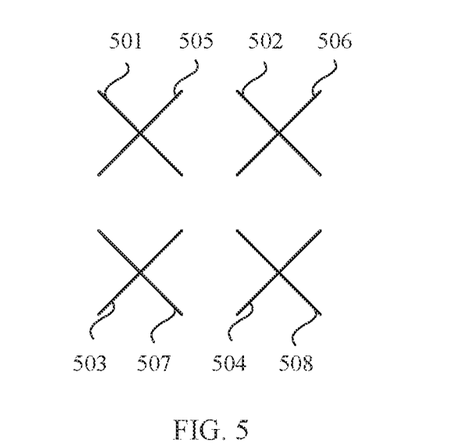
FIG. 5 is a schematic diagram of an antenna unit with a dual-polarized antenna according to an embodiment of this application.

The first antenna and the second antenna have a same polarization direction, and the second antenna and the third antenna are a same dual-polarized antenna. An antenna array shown in FIG. 5 is used as an example. The first antenna is an antenna 501, the second antenna is an antenna 502, and the third antenna is an antenna 506. A polarization direction of the antenna 501 and a polarization direction of the antenna 502 are +45 degrees, and a polarization direction of the antenna 506 is −45 degrees. In this way, the antenna 501 and the antenna 502 have a same polarization direction, and the antenna 502 and the antenna 506 have different polarization directions.

Step 405: When the correlation coefficient of the first antenna and the second antenna is less than or equal to the correlation coefficient of the first antenna and the third antenna, determine that there is inter-polarization out-of-order.

The applicant finds that a channel of a co-polarized antenna has better correlation than that of a hetero-polarized antenna. In other words, when the first antenna and the second antenna have a same polarization direction, and the second antenna and the third antenna have different polarization directions, the correlation coefficient of the first antenna and the second antenna needs to be greater than the correlation coefficient of the first antenna and the third antenna.

When the correlation coefficient of the first antenna and the second antenna is less than or equal to the correlation coefficient of the first antenna and the third antenna, it indicates that a connection between an antenna port of at least one antenna in the first antenna, the second antenna, and the third antenna and a port of an RRU is incorrect. Due to an incorrect connection relationship, actually, the first antenna and the second antenna do not form a co-polarized antenna, or the second antenna and the third antenna do not form a hetero-polarized antenna.

In this embodiment, a correlation coefficient of co-polarized antennas is compared with a correlation coefficient of the hetero-polarized antennas to determine whether the correlation coefficient of the co-polarized antennas is greater than the correlation coefficient of the hetero-polarized antennas. If the correlation coefficient of the co-polarized antennas is not greater than the correlation coefficient of the hetero-polarized antennas, it indicates that there is inter-polarization out-of-order between the antenna port of the foregoing antenna and the port of the RRU. In this way, a new line order detection method is provided, and the new line order detection method has good feasibility.

In the foregoing embodiment, in addition to calculating a correlation coefficient matrix of antennas based on the uplink channel coefficient, the correlation coefficient of antennas may also be calculated based on an uplink received signal strength sequence of each antenna channel.

For example, a first RSSI sequence is $X_1, X_2, \ldots, X_n$, and a second RSSI sequence is $Y_1, Y_2, \ldots, Y_n$, where n is a sequence length.

A correlation coefficient r of the two sequences meets the following formula:

$$r = \frac{\sum_{i=1}^{n}(X_i - \overline{X})(Y_i - \overline{Y})}{\sqrt{\sum_{i=1}^{n}(X_i - \overline{X})^2} \sqrt{\sum_{i=1}^{n}(Y_i - \overline{Y})^2}}, \text{ where}$$

$$\overline{X} = \frac{1}{n}\sum_{i=1}^{n} X_i, \text{ and}$$

$$\overline{Y} = \frac{1}{n}\sum_{i=1}^{n} Y_i.$$

$\overline{X}$ is an average value of the first RSSI sequence, and $\overline{Y}$ is an average value of the second RSSI sequence.

After the correlation coefficient of the antennas is determined, step 404 and step 405 may also be performed to determine whether there is inter-polarization out-of-order.

In a third line sequence method, a line order can be determined based on an angular power spectrum. For details, refer to the following embodiment. As shown in FIG. 6, another embodiment of a line order detection method in this application includes the following steps.

Step 601: Obtain a preset steering vector sequence, where the steering vector sequence includes a steering vector corresponding to each signal incidence angle.

In this embodiment, the signal incidence angle is a horizontal angle of incidence of a signal from a terminal to an antenna. The horizontal angle of incidence is an included angle between a path of the signal from the terminal to the antenna and a horizontal plane. A steering vector corresponding to each signal incidence angle may be obtained in advance.

Step 602: Receive an uplink reference signal sent by the terminal. The uplink reference signal may be an SRS or a DMRS.

Step 603: Perform channel estimation based on the uplink reference signal.

An uplink channel coefficient matrix may be obtained by performing channel estimation based on the uplink reference signal. The uplink channel coefficient matrix includes N channel coefficients, and N is a total quantity of antennas included in an antenna unit. The channel coefficient is in a one-to-one correspondence with the antenna. For example, when the antenna unit includes four antennas, channel coefficients are a 4×1 matrix. For example, when the antenna unit includes eight antennas, channel coefficients are an 8×1 matrix. Because the channel coefficient matrix is an N×1 matrix, the channel coefficient matrix is also referred to as an uplink channel coefficient vector.

Step 604: Determine a matrix set based on all arrangement combinations of uplink channel coefficients in the uplink channel coefficient matrix obtained through channel estimation.

When the antenna unit includes eight antennas, it is assumed that uplink channel coefficients included in an uplink channel coefficient matrix of antennas 1 to 8 are respectively C1, C2, C3, . . . , and C8. C1, C2, C3, . . . , and C8 may be permuted and combined to obtain 8! matrices. Optionally, the 8! matrices are used as the matrix set. Alternatively, after equivalent matrices are excluded from 8!, remaining matrices are used as the matrix set.

Step 605: Determine an angular power spectrum set based on the matrix set and the steering vector sequence.

The angular power spectrum set includes an angular power spectrum of each signal incidence angle. A matrix in the matrix set, a steering vector in the steering vector sequence, and an angular power spectrum in the angular power spectrum set meet the following formula:

$P_{ij}=(V_i \times H_j) \times (V_i \times H_j)^T$, where $V_i$ is an $i^{th}$ steering vector, $H_j$ is a $j^{th}$ matrix, and $P_{ij}$ is an angular power spectrum corresponding to $V_i$ and $H_j$, where i and j are positive integers.

A product of all matrices and all steering vectors may be determined based on the foregoing formula.

Step 606: Determine a target matrix corresponding to a maximum value in the angular power spectrum set.

It may be understood that, when there is only one maximum value in the angular power spectrum set, a corresponding matrix (that is, the target matrix) and a corresponding steering vector may be determined based on the maximum value.

Step 607: When an antenna order corresponding to the target matrix is the same as a preset line order, determine that a connection between an antenna port of the antenna unit and a port of a remote radio unit is correct.

Step 608: When an antenna order corresponding to the target matrix is different from a preset line order, determine that a connection between an antenna port of the antenna unit and a port of a remote radio unit is incorrect.

The preset line order is a correct line order that is set based on a preset rule, for example, 87654321 or 4321.

After the target matrix is determined, corresponding antenna numbers may be determined based on a channel coefficient in the target matrix, and the antenna numbers are arranged based on a sequence of uplink channel coefficients in the target matrix, to obtain an antenna order corresponding to the target matrix. The antenna numbers are consistent with antenna port numbers.

The antenna order corresponding to the target matrix is compared with the preset line order. If the antenna order is the same as the preset line order, it is determined that the connection between the antenna port and the port of the remote radio unit is correct; or if the antenna order is different from the preset line order, it is determined that the connection between the antenna port and the port of the remote radio unit is incorrect.

The applicant finds through research that a phase trend of a channel coefficient is the closest to a phase trend of a steering vector in a correct line order. In this case, an included angle between a channel coefficient vector and the steering vector is the smallest, and a maximum angular power spectrum may be obtained by multiplying the channel coefficient vector and the steering vector. When the antenna order corresponding to the target matrix is different from the preset line order, it indicates that an angular power spectrum corresponding to the preset line order is not a maximum value. Therefore, it can be learned that an error exists in a port connection relationship.

In this embodiment, the angular power spectrum may be calculated based on the steering vector and the channel coefficient matrix, and whether the line order is correct may be determined based on whether a maximum value in all angular power spectrums corresponds to the correct line order.

In an optional embodiment, the line order detection method further includes:

adjusting a preset channel forming matrix based on the antenna order corresponding to the target matrix when the antenna order corresponding to the target matrix is different from the preset line order; and performing channel forming on a to-be-processed radio signal based on the adjusted channel forming matrix.

In this embodiment, an arrangement sequence of weighting factors in the preset channel forming matrix is Q1, Q2, Q3, Q4, Q5, Q6, Q7, and Q8. A quantity of weighting factors and a value of the weighting factor may be set based on an actual situation. This is not limited in this application.

After the preset channel forming matrix is adjusted based on the antenna order corresponding to the target matrix, a sequence of weighting factors in the adjusted channel forming matrix is the same as the antenna order corresponding to the target matrix.

For example, when a rank of an antenna 3 and a rank of the antenna 1 are reversed, the antenna order corresponding to the target matrix and the sequence of the weighting factors in the adjusted channel forming matrix are shown in the following table:

| Antenna order corresponding to a target matrix | Adjusted weighting factor order |
|---|---|
| Antenna 3 | Q3 |
| Antenna 2 | Q2 |
| Antenna 1 | Q1 |
| Antenna 4 | Q4 |
| Antenna 5 | Q5 |
| Antenna 6 | Q6 |
| Antenna 7 | Q7 |
| Antenna 8 | Q8 |

Based on this implementation, when a line order connection is incorrect, channel shaping can be performed based on the adjusted channel forming matrix, so that an expected forming effect is achieved. In this way, the line order does not need to be manually adjusted, and this is more convenient.

Figure 7:
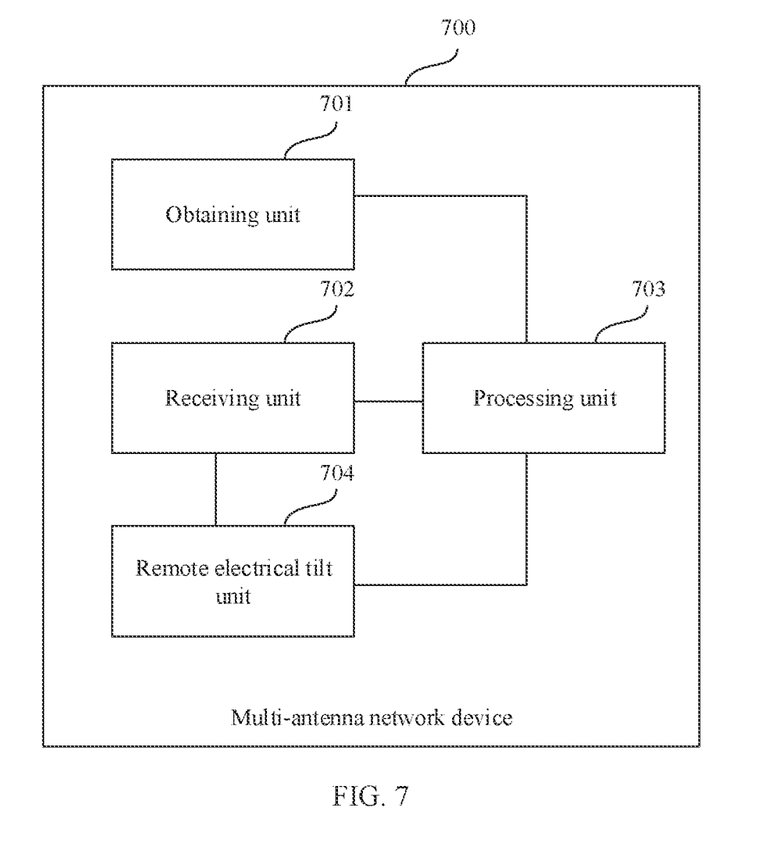
FIG. 7 is a schematic diagram of a structure of a multi-antenna network device according to an embodiment of this application.

This application provides a multi-antenna network device, to implement the line order detection method in the embodiment shown in FIG. 3 or the optional embodiment. Refer to FIG. 7. In an optional embodiment, a multi-antenna network device 700 includes:

an obtaining unit 701, configured to obtain preset antenna numbers of a target antenna group;

a receiving unit 702, configured to: when the target antenna group is configured with a first downtilt angle and a remaining antenna group is configured with a preset downtilt angle, receive a first uplink reference signal sequence sent by a terminal;

a processing unit 703, configured to determine a first uplink received signal strength sequence of each antenna channel based on the first uplink reference signal sequence, where the first uplink received signal strength sequence includes a plurality of uplink received signal strength values; and a remote electrical tilt unit 704, configured to adjust an antenna downtilt angle of the target antenna group from the first downtilt angle to a second downtilt angle, where the remote electrical tilt unit 704 may be specifically a remote electrical tilt unit connected to the target antenna group, where the receiving unit 702 is configured to: when the target antenna group is configured with the second downtilt angle and the remaining antenna group is configured with the preset downtilt angle, receive a second uplink reference signal sequence sent by the terminal;

the processing unit 703 is configured to determine a second uplink received signal strength sequence of each antenna channel based on the second uplink reference signal sequence;

the processing unit 703 is further configured to determine a signal strength change amplitude of each antenna channel based on the first uplink received signal strength sequence and the second uplink received signal strength sequence of each antenna channel;

the processing unit 703 is further configured to determine actual antenna numbers of the target antenna group based on N maximum values in all signal strength change amplitudes, where N is a total quantity of antennas m each antenna group; and the processing unit 703 is further configured to: when there are different antenna numbers in the preset antenna numbers and the actual antenna numbers, determine that an order of lines connecting antenna ports of the target antenna group and ports of a remote radio unit is incorrect.

In an optional embodiment, the signal strength change amplitude is a mean square error of the first uplink received signal strength sequence and the second uplink received signal strength sequence; or the signal strength change amplitude is a variance of the first uplink received signal strength sequence and the second uplink received signal strength sequence.

In another optional embodiment, the processing unit 703 is further configured to: when the preset antenna numbers are the same as the actual antenna numbers, adjust an antenna downtilt angle of each antenna group to a same downtilt angle; determine an uplink channel coefficient of each antenna channel based on an uplink reference signal sent by the terminal; determine a correlation coefficient matrix based on the uplink channel coefficient of each antenna channel; select a correlation coefficient of a first antenna and a second antenna and a correlation coefficient of the first antenna and a third antenna from the correlation coefficient matrix, where the first antenna is any antenna in the remaining antenna group, the second antenna is an antenna that is in the target antenna group and that has a same polarization direction as the first antenna, and the second antenna and the third antenna are a same dual-polarized antenna; and when the correlation coefficient of the first antenna and the second antenna is less than or equal to the correlation coefficient of the first antenna and the third antenna, determine that there is inter-polarization out-of-order.

In another optional embodiment, the multi-antenna network device 700 further includes an alarm module. The alarm module is configured to output alarm information when there are different antenna numbers in the preset antenna numbers and the actual antenna numbers, where the alarm information includes the actual antenna numbers of the target antenna group.

Figure 8:
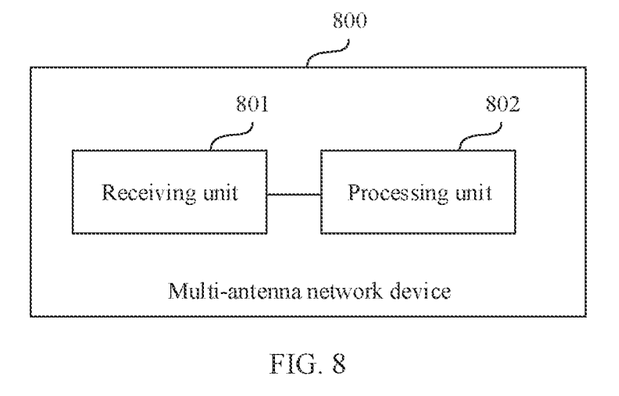
FIG. 8 is another schematic diagram of a structure of a multi-antenna network device according to an embodiment of this application.

This application further provides a multi-antenna network device, to implement the line order detection method in the embodiment shown in FIG. 4. Refer to FIG. 8. In an optional embodiment, a multi-antenna network device 800 includes:

a receiving unit 801, configured to receive an uplink reference signal sent by a terminal; and a processing unit 802, configured to determine an uplink channel coefficient of each antenna channel based on the uplink reference signal.

The processing unit 802 is further configured to determine a correlation coefficient matrix based on the uplink channel coefficient of each antenna channel.

The processing unit 802 is further configured to select a correlation coefficient of a first antenna and a second antenna and a correlation coefficient of the first antenna and a third antenna from the correlation coefficient matrix, where the first antenna and the second antenna have a same polarization direction, and the second antenna and the third antenna are a same dual-polarized antenna.

The processing unit 802 is further configured to: when the correlation coefficient of the first antenna and the second antenna is less than or equal to the correlation coefficient of the first antenna and the third antenna, determine that there is inter-polarization out-of-order.

Figure 9:
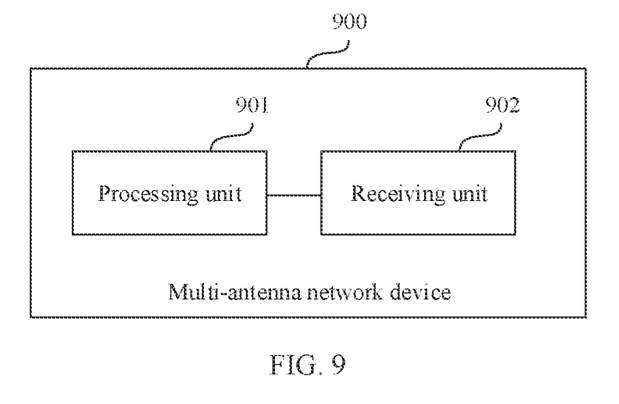
FIG. 9 is another schematic diagram of a structure of a multi-antenna network device according to an embodiment of this application.

This application further provides a multi-antenna network device, to implement the line order detection method in the embodiment shown in FIG. 6 or the optional embodiment. Refer to FIG. 9. In an optional embodiment, a multi-antenna network device 900 includes:

a processing unit 901, configured to obtain a preset steering vector sequence, where the steering vector sequence includes a steering vector corresponding to each signal incidence angle; and a receiving unit 902, configured to receive an uplink reference signal sent by a terminal, where the processing unit 901 is further configured to perform channel estimation based on the uplink reference signal;

the processing unit 901 is further configured to determine a matrix set based on all arrangement combinations of uplink channel coefficients in an uplink channel coefficient matrix obtained through channel estimation;

the processing unit 901 is further configured to determine an angular power spectrum set based on the matrix set and the steering vector sequence, where the angular power spectrum set includes an angular power spectrum of each angle;

the processing unit 901 is further configured to determine a target matrix corresponding to a maximum value in the angular power spectrum set; and the processing unit 901 is further configured to: when an antenna order corresponding to the target matrix is the same as a preset line order, determine that a connection between an antenna port of an antenna unit and a port of a remote radio unit is correct; or when an antenna order corresponding to the target matrix is different from a preset line order, determine that a connection between an antenna port of an antenna unit and a port of a remote radio unit is incorrect.

In an optional embodiment, a matrix in the matrix set, a steering vector in the steering vector sequence, and an angular power spectrum in the angular power spectrum set meet the following formula:

$$P_{ij} = (V_i \times H_j) \times (V_i \times H_j)^T, \text{ where}$$

$V_i$ is an $i^{th}$ steering vector, $H_j$ is a $j^{th}$ matrix, and $P_{ij}$ is an angular power spectrum corresponding to $V_i$ and $H_j$.

In another optional embodiment, the processing unit 901 is further configured to: adjust a preset channel forming matrix based on the antenna order corresponding to the target matrix when the antenna order corresponding to the target matrix is different from the preset line order; and perform channel forming on a to-be-processed radio signal based on the adjusted channel forming matrix, where a sequence of weighting factors in the adjusted channel forming matrix is consistent with the antenna order corresponding to the target matrix.

This application provides a computer-readable storage medium. The computer-readable storage medium stores instructions; and when the instructions are executed, the line order detection methods in the foregoing method embodiments are performed.

This application provides a computer program product including instructions; and when the instructions are executed, the line order detection methods in the foregoing method embodiments are performed.

It should be understood that, the processing unit in this application may be a digital signal processor (DSP), or may be another general-purpose processor, a central processing unit (CPU), an application-specific integrated circuit (ASIC), a programmable gate array (Field Programmable Gate Array, FPGA) or another programmable logic device, a discrete gate, a transistor logic device, a discrete hardware component, or the like. The general-purpose processor may be a microprocessor or the processor may be any conventional processor or the like.

It should be understood that the memory mentioned in this application may be a volatile memory or a nonvolatile memory, or may include a volatile memory and a nonvolatile memory. The nonvolatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. By way of example, and not limitation, many forms of RAMs may be used, for example, a static random access memory (Static RAM, SRAM), a dynamic random access memory (Dynamic RAM. DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (sync link DRAM, SLDRAM), and a direct rambus random access memory (Direct Rambus RAM, DR RAM).

It should be noted that when the processor is a general-purpose processor, a DSP, an ASIC, an FPGA or another programmable logic device, a discrete gate, a transistor logic device, or a discrete hardware component, the memory may be integrated into the processor. It should be noted that the memory described in this specification aims to include but is not limited to these memories and any memory of another proper type.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A line order detection method applied to a multi-antenna network device, wherein the multi-antenna network device is configured with a remote electrical tilt unit and a plurality of antennas, each remote electrical tilt unit is connected to one antenna group, each antenna in the antenna group corresponds to one antenna channel, and the method comprises:
    obtaining preset antenna numbers of a target antenna group;
    when the target antenna group is configured with a first downtilt angle and a remaining antenna group is configured with a preset downtilt angle, receiving a first uplink reference signal sequence sent by a terminal;
    determining a first uplink received signal strength sequence of each antenna channel based on the first uplink reference signal sequence, wherein the first uplink received signal strength sequence comprises a plurality of uplink received signal strength values;
    adjusting an antenna downtilt angle of the target antenna group from the first downtilt angle to a second downtilt angle;
    when the target antenna group is configured with the second downtilt angle and the remaining antenna group is configured with the preset downtilt angle, receiving a second uplink reference signal sequence sent by the terminal;
    determining a second uplink received signal strength sequence of each antenna channel based on the second uplink reference signal sequence;
    determining a signal strength change amplitude of each antenna channel based on the first uplink received signal strength sequence and the second uplink received signal strength sequence of each antenna channel;
    determining actual antenna numbers of the target antenna group based on N maximum values in all signal strength change amplitudes, wherein N is a total quantity of antennas in each antenna group; and
    when the preset antenna numbers are different than the actual antenna numbers, determining that an order of lines connecting antenna ports of the target antenna group and ports of a remote radio unit is incorrect.

2. The method according to claim 1, wherein:
    the signal strength change amplitude is a mean square error of the first uplink received signal strength sequence and the second uplink received signal strength sequence; or
    the signal strength change amplitude is a variance of the first uplink received signal strength sequence and the second uplink received signal strength sequence.

3. The method according to claim 1, wherein the method further comprises:
    when the preset antenna numbers are the same as the actual antenna numbers, adjusting an antenna downtilt angle of each antenna group to a same downtilt angle;
    determining an uplink channel coefficient of each antenna channel based on an uplink reference signal sent by the terminal;
    determining a correlation coefficient matrix based on the uplink channel coefficient of each antenna channel;
    selecting a correlation coefficient of a first antenna and a second antenna and a correlation coefficient of the first antenna and a third antenna from the correlation coefficient matrix, wherein the first antenna is any antenna in the remaining antenna group, the second antenna is an antenna that is in the target antenna group and that has a same polarization direction as the first antenna, and the second antenna and the third antenna are a same dual-polarized antenna; and
    when the correlation coefficient of the first antenna and the second antenna is less than or equal to the correlation coefficient of the first antenna and the third antenna, determining that there is inter-polarization out-of-order.

4. The method according to claim 1, wherein the method further comprises:
    when the preset antenna numbers are different than the actual antenna numbers, sending alarm information, wherein the alarm information comprises the actual antenna numbers of the target antenna group.

5. A line order detection method applied to a multi-antenna network device, wherein the method comprises:
    obtaining a preset steering vector sequence, wherein the preset steering vector sequence comprises a respective steering vector corresponding to each signal incidence angle;
    receiving an uplink reference signal sent by a terminal;
    performing channel estimation based on the uplink reference signal;

determining a matrix set based on all arrangement combinations of uplink channel coefficients in an uplink channel coefficient matrix obtained through channel estimation;

determining an angular power spectrum set based on the matrix set and the preset steering vector sequence, wherein the angular power spectrum set comprises an angular power spectrum of each angle;

determining a target matrix corresponding to a maximum value in the angular power spectrum set; and when an antenna order corresponding to the target matrix is the same as a preset line order, determining that a connection between an antenna port of an antenna unit and a port of a remote radio unit is correct; or when an antenna order corresponding to the target matrix is different from a preset line order, determining that a connection between an antenna port of an antenna unit and a port of a remote radio unit is incorrect.

6. The method according to claim 5, wherein a matrix in the matrix set, the respective steering vector in the preset steering vector sequence, and the angular power spectrum in the angular power spectrum set meet the following formula:

$$P_{ij}=(V_i*H_j)*(V_i*H_j)^T, \text{ wherein}$$

$V_i$ is an $i^{th}$ steering vector, $H_j$ is a $j^{th}$ matrix, and $P_{ij}$ is an angular power spectrum corresponding to $V_i$ and $H_j$.

7. The method according to claim 5, wherein the method further comprises:

adjusting a preset channel forming matrix based on the antenna order corresponding to the target matrix when the antenna order corresponding to the target matrix is different from the preset line order; and performing channel forming on a to-be-processed radio signal based on the adjusted preset channel forming matrix, wherein a sequence of weighting factors in the adjusted preset channel forming matrix is consistent with the antenna order corresponding to the target matrix.

8. A multi-antenna network device, comprising:

at least one processor; and one or more memories coupled to the at least one processor and storing programming instructions that when executed, cause the multi-antenna network device to perform operations comprising:

obtaining preset antenna numbers of a target antenna group;

when the target antenna group is configured with a first downtilt angle and a remaining antenna group is configured with a preset downtilt angle, receiving a first uplink reference signal sequence sent by a terminal;

determining a first uplink received signal strength sequence of each antenna channel based on the first uplink reference signal sequence, wherein the first uplink received signal strength sequence comprises a plurality of uplink received signal strength values;

adjusting an antenna downtilt angle of the target antenna group from the first downtilt angle to a second downtilt angle;

when the target antenna group is configured with the second downtilt angle and the remaining antenna group is configured with the preset downtilt angle, receiving a second uplink reference signal sequence sent by the terminal;

determining a second uplink received signal strength sequence of each antenna channel based on the second uplink reference signal sequence;

determining a signal strength change amplitude of each antenna channel based on the first uplink received signal strength sequence and the second uplink received signal strength sequence of each antenna channel;

determining actual antenna numbers of the target antenna group based on N maximum values in all signal strength change amplitudes, wherein N is a total quantity of antennas in each antenna group; and when the preset antenna numbers are different than the actual antenna numbers, determining that an order of lines connecting antenna ports of the target antenna group and ports of a remote radio unit is incorrect.

9. The multi-antenna network device according to claim 8, wherein:

the signal strength change amplitude is a mean square error of the first uplink received signal strength sequence and the second uplink received signal strength sequence; or the signal strength change amplitude is a variance of the first uplink received signal strength sequence and the second uplink received signal strength sequence.

10. The multi-antenna network device according to claim 8, wherein the operations further comprise:

when the preset antenna numbers are the same as the actual antenna numbers, adjust an antenna downtilt angle of each antenna group to a same downtilt angle;

determining an uplink channel coefficient of each antenna channel based on an uplink reference signal sent by the terminal;

determining a correlation coefficient matrix based on the uplink channel coefficient of each antenna channel;

selecting a correlation coefficient of a first antenna and a second antenna and a correlation coefficient of the first antenna and a third antenna from the correlation coefficient matrix, wherein the first antenna is any antenna in the remaining antenna group, the second antenna is an antenna that is in the target antenna group and that has a same polarization direction as the first antenna, and the second antenna and the third antenna are a same dual-polarized antenna; and when the correlation coefficient of the first antenna and the second antenna is less than or equal to the correlation coefficient of the first antenna and the third antenna, determining that there is inter-polarization out-of-order.

11. The multi-antenna network device according to claim 8, wherein the operations further comprise:

when the preset antenna numbers are different than the actual antenna numbers, sending alarm information, wherein the alarm information comprises the actual antenna numbers of the target antenna group.

* * * * *